US008575516B2

(12) United States Patent
Nishisaka et al.

(10) Patent No.: US 8,575,516 B2
(45) Date of Patent: Nov. 5, 2013

(54) ARC WELDING POWER SOURCE

(75) Inventors: Futoshi Nishisaka, Osaka (JP); Akihiro Ide, Osaka (JP); Tetsuo Era, Osaka (JP); Hiroyasu Mondori, Osaka (JP)

(73) Assignee: Daihen Corporation, Osaka (JP)

( * ) Notice: Subject to any disclaimer, the term of this patent is extended or adjusted under 35 U.S.C. 154(b) by 1330 days.

(21) Appl. No.: 12/221,132

(22) Filed: Jul. 31, 2008

(65) Prior Publication Data
US 2009/0032513 A1   Feb. 5, 2009

(30) Foreign Application Priority Data

Jul. 31, 2007  (JP) .................. 2007-198492

(51) Int. Cl.
*B23K 9/10* (2006.01)
(52) U.S. Cl.
USPC ............... 219/130.1; 219/130.31; 219/130.51
(58) Field of Classification Search
CPC ........................................................ B23K 9/10
USPC ......... 219/130.1, 121.11, 50, 130.21, 130.31, 219/130.32, 130.33, 130.4, 130.5, 130.51, 219/132
See application file for complete search history.

(56) References Cited

U.S. PATENT DOCUMENTS

| 5,233,158 | A | * | 8/1993 | Karakama et al. | ........ 219/130.33 |
| 6,075,225 | A | * | 6/2000 | Heraly et al. | ............... 219/130.5 |
| 6,107,601 | A | * | 8/2000 | Shimogama | ............. 219/130.01 |
| 6,930,280 | B2 | * | 8/2005 | Zauner et al. | .................. 219/132 |
| 6,984,805 | B2 | * | 1/2006 | Shimogama et al. | .... 219/124.34 |

FOREIGN PATENT DOCUMENTS

| JP | 2000-218367 | 8/2000 |
| JP | 2003-62667 | 3/2003 |

* cited by examiner

*Primary Examiner* — Mark Paschall
(74) *Attorney, Agent, or Firm* — Hamre, Schumann, Mueller & Larson, P.C.

(57) ABSTRACT

An arc welding power source supplies a start current, a welding current and a crater current as an output current in accordance with an activating signal supplied from outside. The power source includes a start period setting unit, a crater period setting unit, and a current control unit that controls the output current. The current control unit causes the power source to supply the start current and the welding current consecutively while the activating signal is in an on-state, where the start current is supplied for the start period, and the welding current is supplied for the period following the start period. The current control unit also causes the power source to supply the crater current after the activating signal is turned off, where the crater current is supplied for the crater period.

6 Claims, 6 Drawing Sheets

ARC WELDING POWER SOURCE

BACKGROUND OF THE INVENTION

1. Field of the Invention

The present invention generally relates to an arc welding power source. In particular, the present invention relates to an arc welding power source configured to simplify the sequence of an activating signal for a crater mode and a crater repetition mode.

2. Description of the Related Art

A power source for consumable or nonconsumable electrode arc welding is equipped with a current control mode called crater mode and crater repetition mode. Details of these modes are described below.

FIG. 6 is a timing chart for illustrating the crater mode. In the figure, Graph A shows the waveform of an activating signal On supplied to the power source from outside, and Graph B shows the waveform of a current Io outputted from the power source. In an instance where a human operator manually handles the welding torch, the activating signal On corresponds to the on/off state of the torch switch. In an instance of automatic welding where a welding torch is mounted on an automatic carrier, the activating signal On is a sequence control signal supplied from a programmable logic controller (PLC).

When the activating signal On is turned on (rising to a high level) at time t1 as shown in Graph A, a predetermined start current Is is supplied, as shown in Graph B. Then, when the activating signal On is turned off (falling to a low level) at time t2, a predetermined welding current Iw is supplied. When the activating signal On is turned on (rising to the high level) again at time t3, a predetermined crater current Ic is supplied. When the activating signal On is turned off (falling to the low level) at time t4, the output current Io is terminated, and the welding is stopped.

As shown in FIG. 6, the first on-period of the activating signal On (from time t1 to t2) corresponds to a start period Ts during which the start current Is is supplied. Likewise, the off-period of the activating signal On (from time t2 to t3) corresponds to a welding period Tw during which the welding current Iw is supplied. Further, the second on-period of the activating signal On (from time t3 to t4) corresponds to a crater period Tc during which the crater current Ic is supplied. Accordingly, in order to perform the crater mode welding with the automatic welding machine, the activating signal On shown in Graph A should be produced in a control unit such as a PLC, while the welding power source is set to the crater mode.

FIG. 7 is a timing chart for illustrating the crater repetition mode. In the figure, Graph A shows the waveform of an activating signal On supplied to the power source from outside, and Graph B shows the waveform of an output current Io outputted from the power source.

When the activating signal On is turned on (rising to a high level) at time t1 as shown in Graph A of FIG. 7, a predetermined start current Is is supplied as shown in Graph B of FIG. 7. When the activating signal On is turned off (falling to a low level) at time t2, a predetermined welding current Iw is supplied. When the activating signal On is turned on (rising to the high level) at time t3, a predetermined crater current Ic is supplied. When the activating signal On is turned off (falling to the low level) at time t4; the welding current Iw is supplied again. When the activating signal On is turned on (rising to the high level) at time t5, the crater current Ic is supplied again. When the activating signal On is turned off (falling to the low level) at time t6, the welding current Iw is supplied again. Thereafter, at time t7, when the activating signal On is turned on and off twice within a relatively short period (i.e., double-clicked), the output current Io is terminated, and the welding is stopped.

As seen from FIG. 7, the first on-period of the activating signal On (from time t1 to t2) corresponds to the start period Ts. The first off-period of the activating signal On (from time t2 to t3) corresponds to the welding period Tw. Then the second on-period of the activating signal On (from time t3 to t4) corresponds to the crater period Tc. The second off-period of the activating signal On (from time t4 to t5) corresponds to a repeated welding period Tw. The third on-period of the activating signal On (from time t5 to t6) corresponds to a repeated crater period Tc. The third off-period of the activating signal On (from time t6 to t7) corresponds to another repeated welding period Tw.

The above-described crater repetition mode is often employed when a relatively large crater is created at the end of the welded portion. This is because, in the case where the crater is large, supplying the crater current Ic just once as in the crater mode shown in FIG. 6 is not sufficient for effectively filling the crater. To finish the welding work, the following process may be employed instead of the double-click in the crater repetition mode shown in FIG. 7. When manually performing TIG (tungsten inert gas) welding, it is a common practice to moves the welding torch upward off the welding spot at a desired timing after time t3, thereby forcibly extinguishing the arc to finish the welding. Alternatively, the welding may be repeated when the activating signal On is turned on for a short time after time t3, whereas the welding is terminated when the activating signal On is turned on for a longer time than a predetermined threshold.

In the crater repetition mode, as described above, it is necessary to generate a complicated activating signal On as shown in Graph A of FIG. 7 with a control unit such as the PLC. The foregoing conventional art is described in JP-A-2000-218367 and JP-A-2003-062667, for example.

As noted above, to perform welding in a crater mode or crater repetition mode with the use of a conventional arc welding power source, it is necessary to generate a complicated sequence signal, i.e. the activating signal On shown in Graph A of FIG. 6 or Graph A of FIG. 7.

In using a robot welding machine, a function equivalent to the crater mode or the crater repetition mode can be performed by adding a sequence of an output current condition to the operation program. In the case of the manual welding, on the other hand, the activating signal On is generated through manipulation of the torch switch. Thus, a manipulation error is prone to occur when the operation to be performed is complicated, and the burden imposed on the human operator tends to be heavy. For the automatic welding, the activating signal On is often generated by a general-purpose control unit such as the PLC. In this case, it is necessary to program a complicated sequence of the activating signal On, based on correct and sufficient understanding of the sequence of the crater mode or the crater repetition mode of the welding power source. In composing a program, it is necessary to adjust the start period Ts, the welding period Tw, and the crater period Tc depending on the work to be welded. Such adjustment takes a long time because optimal conditions need to be found while correcting the program for the PLC, whereby the production efficiency deteriorates.

SUMMARY OF THE INVENTION

The present invention has been proposed under the circumstances described above. It is therefore an object of the present invention to provide an arc welding power source in which a sequence of an activating signal supplied from outside can be simplified in performing welding in a crater mode or a crater repetition mode.

According to the present invention, there is provided an arc welding power source that supplies a start current, a welding current and a crater current as an output current in accordance with an activating signal supplied from outside. The power source comprises: a start period setting unit that sets a start period; a crater period setting unit that sets a crater period; and a current control unit that controls the output current. The current control unit causes the power source to supply the start current and the welding current consecutively while the activating signal is in an on-state, where the start current is supplied for the start period, and the welding current is supplied for a period following the start period. The current control unit also causes the power source to supply the crater current after the activating signal is turned off, where the crater current is supplied for at least one crater period.

In a preferred embodiment, the current control unit causes the power source to stop the supplying of the output current to terminate welding immediately after the crater period is over.

Preferably, the arc welding power source of the present invention may further comprise: a repeated welding period setting unit that sets a repeated welding period; and a repetition number setting unit that sets a repetition number. The current control unit causes the power source to supply the welding current for the repeated welding period following said at least one crater period, and to supply the crater current for a second crater period following the repeated welding period. The current control unit causes repetition of the current supplying, and then causes the power source to stop the supplying of the output current to terminate welding when the number of times the crater current is supplied reaches the repetition number set by the repetition number setting unit.

Preferably, the arc welding power source of the present invention may further comprise a repeated welding current setting unit that sets a repeated welding current, in addition to the repeated welding period setting unit and the repetition number setting unit. In this case, the current control unit causes the power source to supply the repeated welding current for the repeated welding period following said at least one crater period, and to supply the crater current for a second crater period following the repeated welding period. The current control unit causes repetition of the current supplying, and also causes the power source to stop the supplying of the output current to terminate welding when the number of times the crater current is supplied reaches the repetition number set by the repetition number setting unit.

In the above arrangement, the repeated period welding current may be 0 A.

In a preferred embodiment, the output current may be adjusted by changing the feeding speed of a welding wire.

According to the present invention, the welding in the crater mode or the crater repetition mode is performed simply by turning the activating signal on and off only once. This simplifies the generation of the activating signal in the automatic welding process, thereby simplifying the program of the PLC or the like. Further, in the case of the manual welding, the manipulation of the torch switch is simplified, which alleviates the burden on the welding operator.

DETAILED DESCRIPTION OF THE PREFERRED EMBODIMENTS

Preferred embodiments of the present invention will be described referring to the accompanying drawings.

First Embodiment

Figure 1:
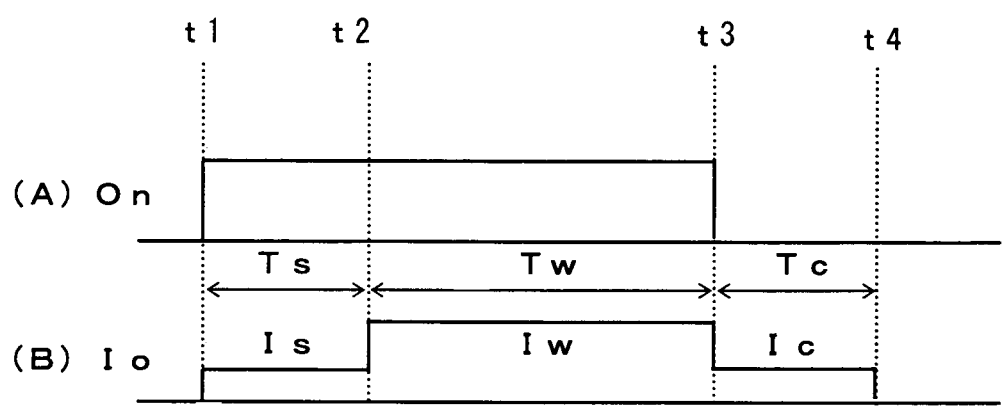
FIG. 1 is a timing chart for illustrating a crater mode according to a first embodiment of the present invention.

FIG. 1 is a timing chart for illustrating a crater mode according to a first embodiment of the present invention. In the figure, Graph A shows the waveform of an activating signal On, and Graph B shows the waveform of an output current Io.

Figure 6:
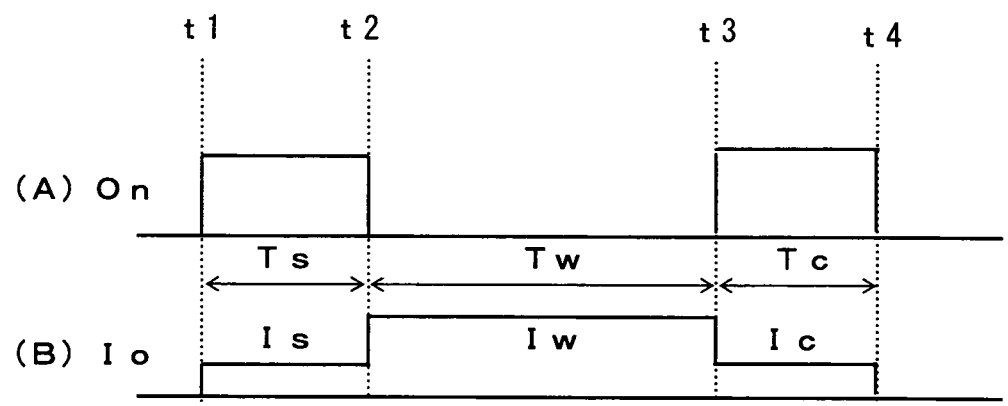
FIG. 6 is a timing chart for illustrating a conventional crater mode.
Figure 7:
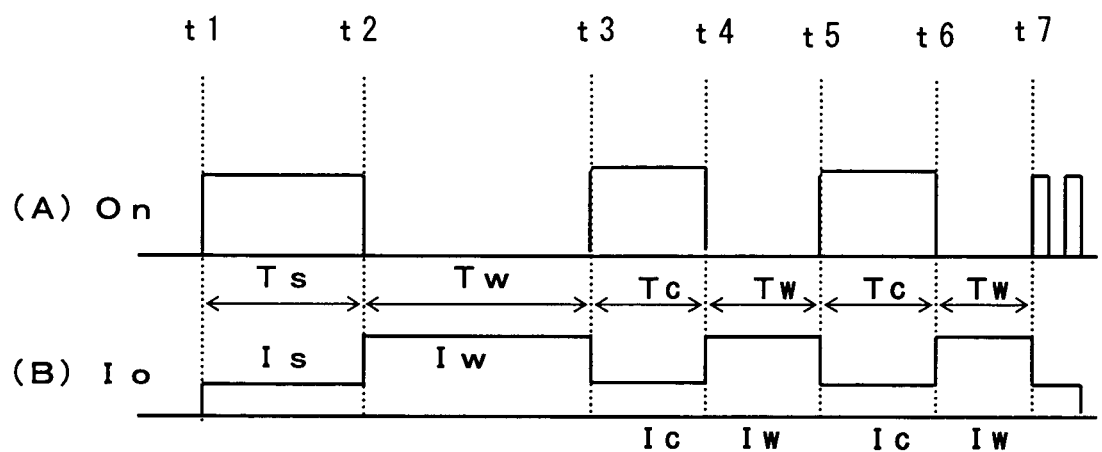
FIG. 7 is a timing chart for illustrating a conventional a crater repetition mode.

A start current Is, a welding current Iw and a crater current Ic can be adjusted to desired values by manipulation of adjusting knobs or the like provided on an operation panel of the welding power source, as in conventional systems. On the other hand, a start period Ts and a crater period Tc are determined, differing from the conventional art, by manipulation of the adjusting knobs or the like provided on the operation panel of the welding power source. In the conventional art, as stated above with reference to FIG. 6, the two periods Ts and Tc are determined in accordance with the on-periods of the activating signal On.

As seen from FIG. 1, when the activating signal On is turned on (rises to a high level) at time t1 as shown in Graph A, a predetermined start current Is is supplied for a predetermined start period Ts, as shown in Graph B. The start period Ts is terminated at time t2 while the activating signal On remains on (at the high level) until time t3. Thus, a predetermined welding current Iw is supplied for the welding period Tw from time t2 to t3 as shown in Graph B. When the activating signal On is turned off (falls to a low level) at time t3, a predetermined crater current Ic is supplied for a predetermined crater period Tc. When the crater period Tc is terminated at time t4, the output current Io is terminated, and the welding is stopped.

In the above embodiment, the activating signal On is simply turned on at time t1 and turned off at time t3, which allows generating a simplified sequence signal. The start period Ts, provided for forming beads in a good appearance at the start of the arc generation, is set to an appropriate value depending on the work or the object to be welded. The period from time t1 to t3 for which the activating signal On is on basically corresponds to the welding length for the work, and hence the travel distance of the welding torch. The crater period Tc is provided for crater treatment, i.e., filling craters, and set to an appropriate value depending on the work.

Figure 2:
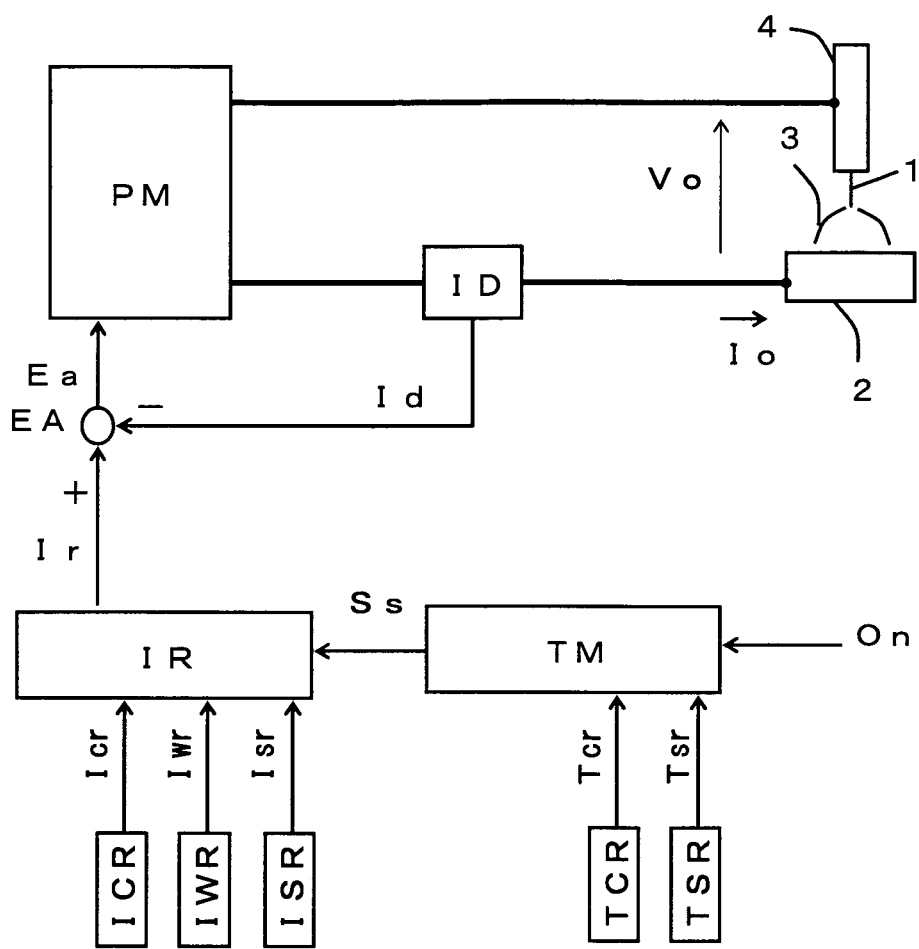
FIG. 2 is a block diagram of an arc welding power source according to the first embodiment of the present invention.

FIG. 2 is a block diagram of an arc welding power source according to the first embodiment of the present invention.

Specifically, a power supply main circuit PM receives power from a commercially available power source rated as three-phase 200 V for example, and performs output control such as inverter control according to an error amplification signal Ea, and supplies output current Io and output voltage Vo for generating an arc. The welding torch 4 has a tip at which an electrode 1 is provided. For performing welding, an arc 3 is generated between the electrode 1 and a base metal (work) 2.

A current detection circuit ID serves to detect the output current Io, and to output a current detection signal Id. A start period setting circuit TSR outputs a start period setting signal Tsr. A crater period setting circuit TCR outputs a crater period setting signal Tcr. A timer control circuit TM outputs a status signal Ss. When the activating signal On supplied from outside is on (high level), the status signal Ss takes a value of 1 for a period determined by the start period setting signal Tsr, and then takes a value of 2 after that period (value 1 period) is over. When the activating signal On is off (low level), the status signal Ss takes a value of 3 for a period determined by the crater period setting signal Tcr, and then takes an initial value of 0 after that period (value 3 period) is over.

A start current setting circuit ISR outputs a start current setting signal Isr. A welding current setting circuit IWR outputs a welding current setting signal Iwr. A crater current setting circuit ICR outputs a crater current setting signal Icr. A current setting control unit IR outputs a current setting signal Ir. This current setting signal Ir is equal to the start current setting signal Isr (in other words, the start current setting signal Isr is outputted as a current setting signal Ir) when the status signal Ss=1. Likewise, the current setting signal Ir is equal to the welding current setting signal Iwr when the status signal Ss=2, and equal to the crater current setting signal Icr when the status signal Ss=3. When the status signal Ss=0, the current setting signal Ir takes a value of 0.

An error amplification circuit EA amplifies the difference between the current setting signal Ir and the current detection signal Id, to output an error amplification signal Ea to the power supply main circuit PM. Upon receiving the signal Ea, the power supply main circuit PM causes the output current Io (Graph B in FIG. 1) to pass through the welding spot.

The setting circuits TSR, TCR, ISR, IWR and ICR may be provided in the operation panel of the welding power source. It is possible to provide one or more of these circuits in a remote controller for the power source. In the present invention, the timer control circuit TM and the current setting control unit IR constitute a current controller for controlling the output current Io.

The first embodiment enables one to perform welding in the crater mode simply, that is, by turning the activating signal on and off only once. Accordingly, the generation of the activating signal in the automatic welding process is simplified, and hence the programming for the PLC is simplified. Further, in the case of the manual welding, the manipulation of the torch switch is simplified, which alleviates the burden on the human welding operator.

Second Embodiment

Figure 3:
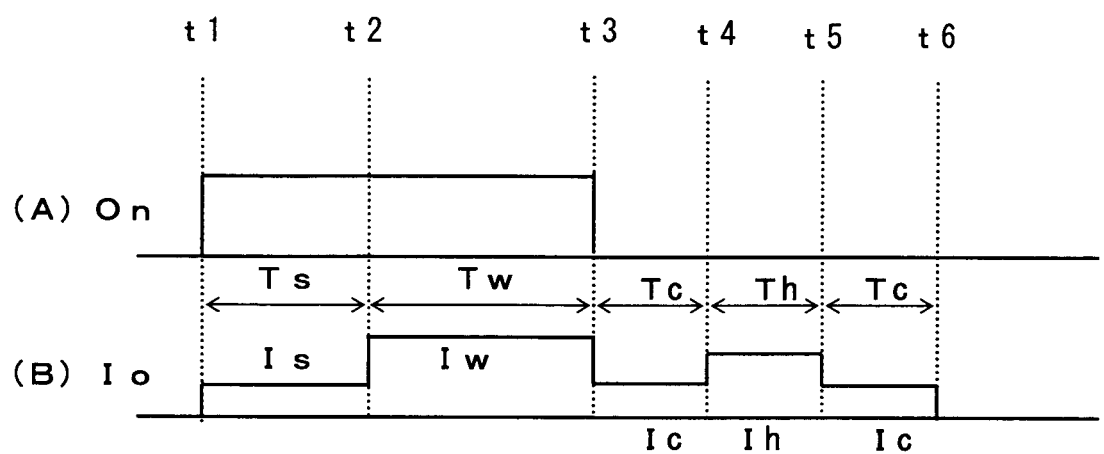
FIG. 3 is a timing chart for illustrating a crater repetition mode according to a second embodiment of the present invention.

FIG. 3 is a timing chart for illustrating a crater repetition mode according to a second embodiment of the present invention. In the figure, Graph A shows the waveform of an activating signal On, and Graph B shows the waveform of an output current Io.

In the second embodiment, a start current Is, a welding current Iw, a crater current Ic, a repeated period welding current Ih, a start period Ts, a crater period Tc, a repeated welding period Th, and the repetition number (number of iterations) N are determined in advance.

When the activating signal On is turned on (rises to a high level) at time t1 as shown in Graph A of FIG. 3, a start current Is is supplied for the predetermined start period Ts as shown in Graph B of FIG. 3. When the start period Ts is over at time t2, the predetermined welding current Iw is supplied for the period during which the activating signal On is on (high level). When the activating signal On is turned off (low level) at time t3, the predetermined crater current Ic is supplied for the predetermined crater period Tc. When the crater period Tc is over at time t4, the predetermined repeated period welding current Ih (having a smaller value than the welding current Iw) is supplied for the predetermined repeated welding period Th. When the repeated welding period Th is over at time t5, the crater current Ic is supplied for the crater period Tc. Then, at time t6, the output current Io is terminated, and the welding is stopped. In the second embodiment, the timing of terminating the output current Io is preset as follows: after the activating signal On is turned off (low level) at time t3, the number of times the crater period Tc is repeated is counted. Then, when the count number becomes equal to the predetermined repetition number N, the output current Io will be terminated at the time when the current crater period Tc is over. In the illustrated example, the repetition number N is preset to 2, and therefore the output current Io is terminated at time 6, when the second crater period Tc come to an end. In this manner, welding in the crater repetition mode can be performed simply by turning the activating signal on and off only once.

Figure 4:
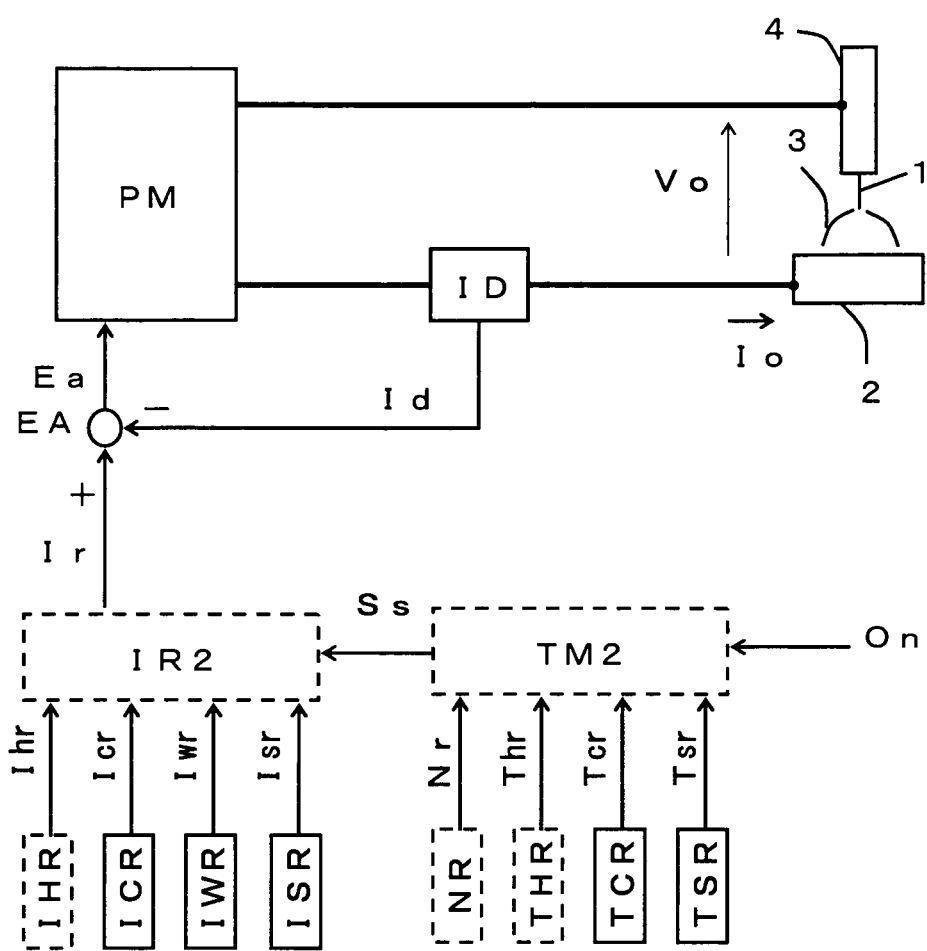
FIG. 4 is a block diagram of an arc welding power source according to the second embodiment of the present invention.

FIG. 4 is a block diagram illustrating an arc welding power source according to the second embodiment of the present invention. In FIG. 4, the same blocks as those shown in FIG. 2 are designated by the same references, and their descriptions will be omitted. Only the different blocks depicted in broken lines will be described below.

A repeated welding period setting circuit THR outputs a repeated welding period setting signal Thr. A repetition number setting circuit NR outputs a repetition number setting signal Nr. A second timer control circuit TM2 outputs a status signal Ss. When the activating signal On supplied from outside is on (high level), the status signal Ss takes a value of 1 for a period determined by the start period setting signal Tsr, and then takes a value of 2 after that period (value 1 period) is over. When the activating signal On is off (low level), the status signal Ss takes a value of 3 for a period determined by the crater period setting signal Tcr, and takes a value of 4 for a period determined by the repeated welding period setting signal Thr. Thereafter, every time the crater period Tc and the repeated welding period Th appear, the status signal Ss takes a value of 3 and 4, respectively. Then, when the number of appearance of the periods determined by the crater period setting signal Tcr becomes equal to the preset number determined by the repetition number setting signal Nr, the status signal Ss takes an initial value of 0.

A repeated period welding current setting circuit IHR outputs a repeated period welding current setting signal Ihr. A second current setting control unit IR2 outputs a current setting signal Ir. This current setting signal Ir is equal to the start current setting signal Isr (in other words, the start current setting signal Isr is outputted as a current setting signal Ir) when the status signal Ss=1. Likewise, the current setting signal Ir is equal to the welding current setting signal Iwr when the status signal Ss=2, and equal to the crater current setting signal Icr when the status signal Ss=3. When the status signal Ss=4, the current setting signal Ir is equal to the repeated welding current setting signal Ihr. When the status signal Ss=0, the current setting signal Ir takes a value of 0. In accordance with such current setting signal Ir, the output current Io shown in Graph B of FIG. 3 is supplied.

In the second embodiment described above, the repeated welding current Ih is set to be weaker than the welding current Iw. Alternatively, the repeated welding current Ih may be equal (or substantially equal) to the welding current Iw. In this case, the repeated welding current setting circuit IHR shown in FIG. 4 can be omitted.

Figure 5:
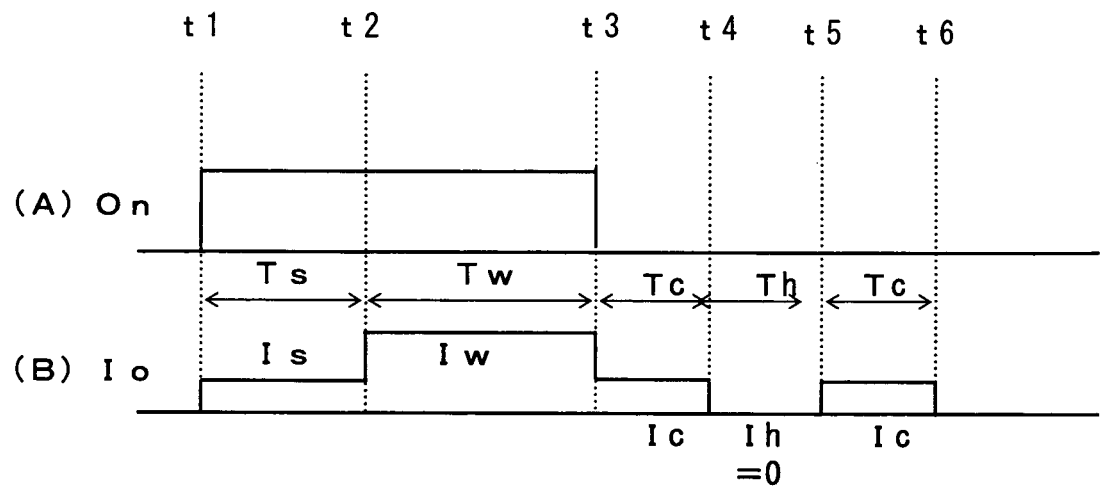
FIG. 5 a timing chart representing the case where the repeated period welding current Ih shown in FIG. 3 is set to be 0 A.

FIG. 5 is a timing chart representing the case where the repeated period welding current Ih is set to be 0 in the chart shown in FIG. 3. In other words, the output current Io is temporarily stopped (set to be 0 A) for the repeated welding period Th during the welding operation in progress. In this case again, after the activating signal On is turned off (low level) at time t3, the output current Io will be terminated completely at time t6 to stop the welding operation when the number of the repeated crater periods Tc reaches the preset repetition number N.

According to the second embodiment, the welding in the crater repetition mode can be performed simply by turning the activating signal on and off only once. This simplifies the generation of the activating signal in the automatic welding process, thereby simplifying the program of the PLC. In the case of manual welding, the manipulation of the torch switch is simplified, which alleviates the burden on the human welding operator.

The above embodiments employ a nonconsumable electrode arc welding power source, in which the output current Io is controlled directly by the current setting signal Ir. It should be noted that the present invention is also applicable to a consumable electrode arc welding power source. In this case, the output current Io is controlled indirectly by controlling the feeding speed of the welding wire in accordance with the current setting signal Ir. Further, in the above embodiments, the output current Io is sharply changed to attain different values (Is, Iw, IC, Ih). The present invention is not limited to this, and the current change may be made with an appropriate positive or negative gradient (upward slope or downward slope).

The invention claimed is:

1. An arc welding power source that supplies a start current, a welding current and a crater current as an output current in accordance with an activating signal supplied from outside, the power source comprising:
    a start period setting unit that is configured to set a start period;
    a crater period setting unit that is configured to set a crater period;
    a current control unit that is configured to control the output current;
    a repeated welding period setting unit that is configured to set a repeated welding period; and
    a repetition number setting unit that is configured to set a repetition number of crater periods;
    wherein the current control unit is configured to cause the power source to supply the start current and the welding current consecutively while the activating signal is in an on-state, the start current being supplied for the start period, the welding current being supplied for a period following the start period, wherein the current control unit is configured to cause the power source to supply the crater current as a constant current after the activating signal is turned off, the crater current being supplied for a first crater period;
    wherein the current control unit is configured to cause the power source to supply a welding current for the repeated welding period following the first crater period, and to supply the crater current for a second crater period following the repeated welding period, the current control unit is configured to cause repetition of supplied current, and
    wherein the current control unit is configured to cause the power source to stop the supplying of the output current to terminate welding when a number of repeated crater periods, including the first crater period and the second crater period, reaches the repetition number of crater periods set by the repetition number setting unit.

2. The arc welding power source according to claim 1, further comprising a repeated welding current setting unit that is configured to set the welding current supplied for the repeated welding period.

3. The arc welding power source according to claim 2, wherein the welding current supplied for the repeated welding period is 0 A.

4. The arc welding power source according to claim 1, wherein the output current is adjusted by changing a feeding speed of a welding wire.

5. The arc welding power source according to claim 2, wherein the output current is adjusted by changing a feeding speed of a welding wire.

6. The arc welding power source according to claim 3, wherein the output current is adjusted by changing a feeding speed of a welding wire.

* * * * *